US011400010B2

(12) United States Patent
Smith et al.

(10) Patent No.: US 11,400,010 B2
(45) Date of Patent: *Aug. 2, 2022

(54) METHOD AND SYSTEM FOR CONTROL AND OPERATION OF MOTORIZED ORTHOTIC EXOSKELETON JOINTS

(71) Applicant: Leonis Medical Corporation, Moffett Field, CA (US)

(72) Inventors: Jonathon A. Smith, Moffett Field, CA (US); Kern Bhugra, Moffett Field, CA (US)

(73) Assignee: Leonis Medical Corporation, Aptos, CA (US)

( * ) Notice: Subject to any disclaimer, the term of this patent is extended or adjusted under 35 U.S.C. 154(b) by 593 days.

This patent is subject to a terminal disclaimer.

(21) Appl. No.: 16/405,785

(22) Filed: May 7, 2019

(65) Prior Publication Data
US 2019/0262214 A1 Aug. 29, 2019

Related U.S. Application Data

(63) Continuation of application No. 14/675,902, filed on Apr. 1, 2015, now Pat. No. 10,278,885, which is a (Continued)

(51) Int. Cl.
*A61H 3/00* (2006.01)
*A61H 1/02* (2006.01)
*B25J 9/00* (2006.01)

(52) U.S. Cl.
CPC ............... *A61H 3/00* (2013.01); *A61H 1/024* (2013.01); *A61H 1/0266* (2013.01);
(Continued)

(58) Field of Classification Search
CPC .......... A61H 1/02; A61H 1/0255; A61H 3/00; A61H 1/0262; A61H 1/00;
(Continued)

(56) References Cited

U.S. PATENT DOCUMENTS

| 4,669,451 A | * | 6/1987 | Blauth | ............ | A61F 5/013 |
| | | | | | 482/901 |
| 5,888,235 A | | 3/1999 | Jacobsen et al. | | |

(Continued)

FOREIGN PATENT DOCUMENTS

| EP | 0302148 A1 | 2/1989 | | |
| WO | 2010018358 A2 | 2/2010 | | |
| WO | WO-2010140984 A1 | * | 12/2010 | ........... A61H 1/0288 |

*Primary Examiner* — Tu A Vo
(74) *Attorney, Agent, or Firm* — Perkins Coie LLP; Andrew T. Pettit

(57) ABSTRACT

System and method for providing both powered and free swing operation in a powered orthotic exoskeleton joint. The joint includes a processor controllable ratchet wheel and pawl type clutch, configured to engage or disengage upon receiving force from a servo actuator. When the processor determines that the clutch should be engaged, it directs the powered actuator to couple the pawls to the ratchet wheel, allowing torque to be transferred from the joint's powered motor, through the clutch, to the gearing that subsequently controls the motion of the joint. Conversely, the processor can direct the powered actuator to decouple the pawls from the ratchet wheel. This in turn decouples the ratchet wheel from the motor, thus allowing the remainder of the joint and any associated joint gearing to engage in relatively free swing motion, without any interference from the motor.

6 Claims, 17 Drawing Sheets

Related U.S. Application Data continuation-in-part of application No. 13/562,131, filed on Jul. 30, 2012, now Pat. No. 9,545,353.

(60) Provisional application No. 61/973,996, filed on Apr. 2, 2014, provisional application No. 61/513,507, filed on Jul. 29, 2011.

(52) U.S. Cl.
CPC ....... *B25J 9/0006* (2013.01); *A61H 2003/007* (2013.01); *A61H 2201/018* (2013.01); *A61H 2201/0184* (2013.01); *A61H 2201/1207* (2013.01); *A61H 2201/1215* (2013.01); *A61H 2201/1445* (2013.01); *A61H 2201/164* (2013.01); *A61H 2201/165* (2013.01); *A61H 2201/1642* (2013.01); *A61H 2201/1676* (2013.01); *A61H 2201/5007* (2013.01); *A61H 2201/5061* (2013.01); *A61H 2201/5064* (2013.01); *A61H 2201/5069* (2013.01); *A61H 2205/10* (2013.01)

(58) Field of Classification Search
CPC .... A61H 2001/0203; A61H 2001/0211; A61H 1/0237; A61H 2201/12; A61H 2201/14; A61H 2201/1445; A61H 2201/1481; A61H 2201/149; A61H 2201/164; A61H 2201/1642; A61H 2205/12; A61H 2205/106; B25J 9/00–14; F16D 41/12; A61F 2002/6847; A61F 2002/685; A61F 2002/6836; A61F 5/0127; A43B 7/18; A43B 5/0452; A43B 5/0454; A43B 5/0456; A43B 5/046

See application file for complete search history.

(56) References Cited

U.S. PATENT DOCUMENTS

| | | | |
|---|---|---|---|
| 6,146,341 A * | 11/2000 | Sato | A61H 1/0274 482/44 |
| 8,123,709 B2 | 2/2012 | DeHarde et al. | |
| 9,545,353 B2 | 1/2017 | Smith et al. | |
| 2003/0120183 A1 | 6/2003 | Simmons | |
| 2003/0144614 A1 | 7/2003 | Cordo | |
| 2004/0102723 A1 | 5/2004 | Horst et al. | |
| 2005/0166413 A1 | 8/2005 | Crampton et al. | |
| 2006/0167562 A1 | 7/2006 | Williams et al. | |
| 2006/0189899 A1 | 8/2006 | Flaherty et al. | |
| 2007/0135279 A1 | 6/2007 | Purdy et al. | |
| 2008/0009771 A1 | 1/2008 | Perry et al. | |
| 2008/0269027 A1* | 10/2008 | Chen | A61H 1/0266 482/80 |
| 2008/0287850 A1 | 11/2008 | Adarraga | |
| 2009/0204038 A1 | 8/2009 | Smith et al. | |
| 2009/0264799 A1 | 10/2009 | Bonutti et al. | |
| 2009/0306548 A1 | 12/2009 | Bhugra et al. | |
| 2010/0038983 A1 | 2/2010 | Bhugra et al. | |
| 2010/0039052 A1 | 2/2010 | Horst et al. | |
| 2010/0125229 A1 | 5/2010 | Rudolph et al. | |
| 2010/0144490 A1 | 6/2010 | Purdy et al. | |
| 2010/0185301 A1 | 7/2010 | Hansen et al. | |
| 2011/0313331 A1 | 12/2011 | Dehez et al. | |
| 2012/0071797 A1 | 3/2012 | Aoki et al. | |
| 2013/0046218 A1 | 2/2013 | Wiggin et al. | |
| 2017/0196751 A1 | 7/2017 | Smith et al. | |

\* cited by examiner

METHOD AND SYSTEM FOR CONTROL AND OPERATION OF MOTORIZED ORTHOTIC EXOSKELETON JOINTS

CROSS-REFERENCE TO RELATED APPLICATION(S)

This application is a continuation application of U.S. patent application Ser. No. 14/675,902, filed Apr. 1, 2015, and will issue as U.S. Pat. No. 10,278,885 on May 7, 2019, which claims the benefit of U.S. Provisional Patent Application No. 61/973,996, filed Apr. 2, 2014, and is a continuation-in-part of U.S. patent application Ser. No. 13/562,131, filed Jul. 30, 2012 and issued as U.S. Pat. No. 9,545,353 on Jan. 17, 2017, which claims the benefit of U.S. Provisional Application No. 61/513,507, filed Jul. 29, 2012, all of which are incorporated herein by reference thereto.

TECHNICAL FIELD

This invention is in the field of motorized control methods and systems for orthotics and prosthetics.

BACKGROUND

Normal human motion, in particular limb motion, is a complex activity in which human muscles of normal strength, attached to normally strong and flexible bones and joints, must be precisely controlled by a normally functioning nervous system in order to achieve the desired result, such as normal walking, sitting, standing up, and other daily activities. Damage to any of these components—muscles, bones, joints, or nervous system can greatly hinder normal activity.

Unfortunately, such damage is quite common, particularly as a response to accident, disease or even normal ageing. As a result, there is a large medical interest in various artificial systems and methods to provide additional support to assist patients who may be suffering from damage in any of these areas.

In particular, prior art in this areas has focused in various types of orthotic devices, such as braces that can be strapped to a limb and either help support joints, or restrict or immobilize joint motion as desired.

In more recent years, there has been interest in the field at producing various types of strap-on orthotic exoskeleton devices that can further assist human motion through various motors, actuators, control systems and feedback systems. However work in this area remains at an unsatisfactory level of development.

SUMMARY

In some embodiments, the invention may be devices and methods to produce and operate strap-on powered orthotic exoskeletons that are more effective than prior art devices. One area where prior art powered orthotic exoskeleton work was particularly deficient was in a general inability of prior art devices and methods to mimic the complex nature of normal human motion.

Normal human motion, such as walking, is a complex activity in which, during some portions of a normal stride or gait, leg muscles provide power to certain joints, such as the knee, ankle, and hip joints. During other portions of a normal stride or gait, however, these muscles relax and the limb and limb joint may act more as a free swinging pendulum. However, prior art devices generally were inadequate in reproducing this type of motion.

In some embodiments, the present invention may be used to produce powered orthotic exoskeletons that can help the patient or user to obtain the benefits of a power assist during certain times (e.g. while standing or other activity), while at the same time also producing a power assist that gracefully decouples from the orthotic during times that it is not needed. This "available when needed, unobtrusive when not needed" feature can be beneficial and valued by patients.

Another aspect of the present invention is to provide devices and methods for powered orthotic exoskeletons that can provide power or force to protect the patient (e.g. to prevent an unwanted amount of joint rotation in a patient with a damaged joint) when needed, but again which would gracefully decouple from the orthotic system when not needed.

In one embodiment, the invention may be a system and method of operating a motorized orthotic exoskeleton joint. The invention may rely, in part, upon an actuator controlled clutch device that can, depending upon control signals, rapidly couple or decouple at least a portion of the gear mechanism of an orthotic exoskeleton joint from a motor system. In some embodiments, this actuator controlled clutch device can be further configured to also allow the joint to move relatively freely in situations where the joint rotation speed exceeds the driving speed of the motor and gearing system.

Further, in some embodiments, the invention may be a system and method for providing both powered and free swing operation in a powered joint for an orthotic exoskeleton. Often this powered joint will comprise at least one electrically powered motor, and at least one electrically powered actuator. Here the invention may comprise a strap-on orthotic exoskeleton equipped with one or more powered joints, as well as a processor, sensors, software and access to a power source.

These powered joints, in turn, may comprise a processor controllable clutch, such as a ratchet wheel and pawl type clutch, configured to engage or disengage upon receiving force from the electrically powered servo actuator. In this configuration, the processor determines that the clutch should be engaged, the processor can direct the powered servo actuator to couple the pawls (which may be motor driven) to the ratchet wheel. This can allow torque to be transferred from powered motor, through the clutch, to the gearing that subsequently controls the motion of the joint. Conversely, when the processor determines that the clutch should be disengaged, the processor can direct the powered actuator to decouple the pawls from the ratchet wheel. This, in turn, decouples the ratchet wheel from the motor, thus allowing the remainder of the joint and any associated gearing to engage in relatively free swing motion, without any interference from the motor.

In some embodiments, the system may be made modular in design, and/or can be customized during assembly or manufacture to the particular needs of an individual patient. For example, in some embodiments, a patient that only needs powered actuation for the patient's foot, but not the patient's knee, can be fitted with an appropriately built active orthotic device that only provides powered actuation at the patient's foot (e.g. ankle). In other cases, only a device with powered knee actuation may be needed. In still other embodiments, a patient that has multiple problems, weak hip extensors, weak quadriceps control, and foot drop may require an orthosis manufactured with motor modules, sensors, batteries, hardware, software, and cabling to support all three joints—namely, hip, ankle, and foot.

Thus, in some embodiments, the invention may also be a method for providing powered actuation (via the invention's motor modules, sensors, software, hardware, batteries, and cabling (or any subset of these)) to any of a number of differently configured custom or non-customized orthotic devices. Depending upon the need, the invention can then apply powered assistance and/or resistance to one or more regions (often corresponding to patient joints) of an orthotic exoskeleton. The net result can be a flexible or modular customizable powered exoskeleton orthoses which can provide external forces for assistance, rehabilitation, or mobility.

BRIEF DESCRIPTION OF THE DRAWINGS

FIG. 8A shows the polycentric joint operating at an essentially straight 180 degree angle. FIG. 8B shows the polycentric joint operating at a highly bent angle, and FIG. 8C shows the polycentric joint operating at various angles in between.

DETAILED DESCRIPTION

The inventor's previous work in this area is described in U.S. patent application Ser. No. 13/562,131 and U.S. provisional application 61/513,507; as well as provisional application 61/973,996; the entire contents of all of these applications are incorporated herein by reference.

In this disclosure, the examples and embodiments will generally focus on use in orthotic exoskeletons intended for use by human users. In these embodiments, one or more of the user's arms or legs may still be intact, but incapable of normal function due to tissue damage, neurological defects, and the like. However these examples are not intended to be limiting. In other embodiments, the invention's various devices and methods may be configured for veterinary purposes (e.g. for producing an orthotic exoskeleton for an animal such as a horse). In other embodiments, the invention's various devices and methods may be configured to act in a full or partial prosthetic, in which the human or animal arm or leg may not be fully intact.

More specifically, in some embodiments, the invention may be a system, device, or method intended to be used in an orthotic exoskeleton or super-structure. This can be, for example, a leg mounted orthotic exoskeleton intended to be worn on the leg of the user to assist or resist the activities of the user as desired.

In this embodiment, a leg mounted orthotic exoskeleton, for example, may include a thigh structure, a shank structure, and a foot bed structure. The thigh and the shank structures may be attached to one another both medially and laterally by polycentric joints designed to approximate the non-concentric motion of the knee joint.

The shank and the foot bed structures in turn may be attached together with a simple concentric joint. This type of concentric joint can be implemented to generally follow (or allow) the range of motion of the nominal human body; or alternatively can be customized to either limit or extend the range (e.g. for therapeutic purposes) as prescribed by an orthotics practitioner or other health care professional, or as adjusted by the patient or caretaker.

Figure 1A:
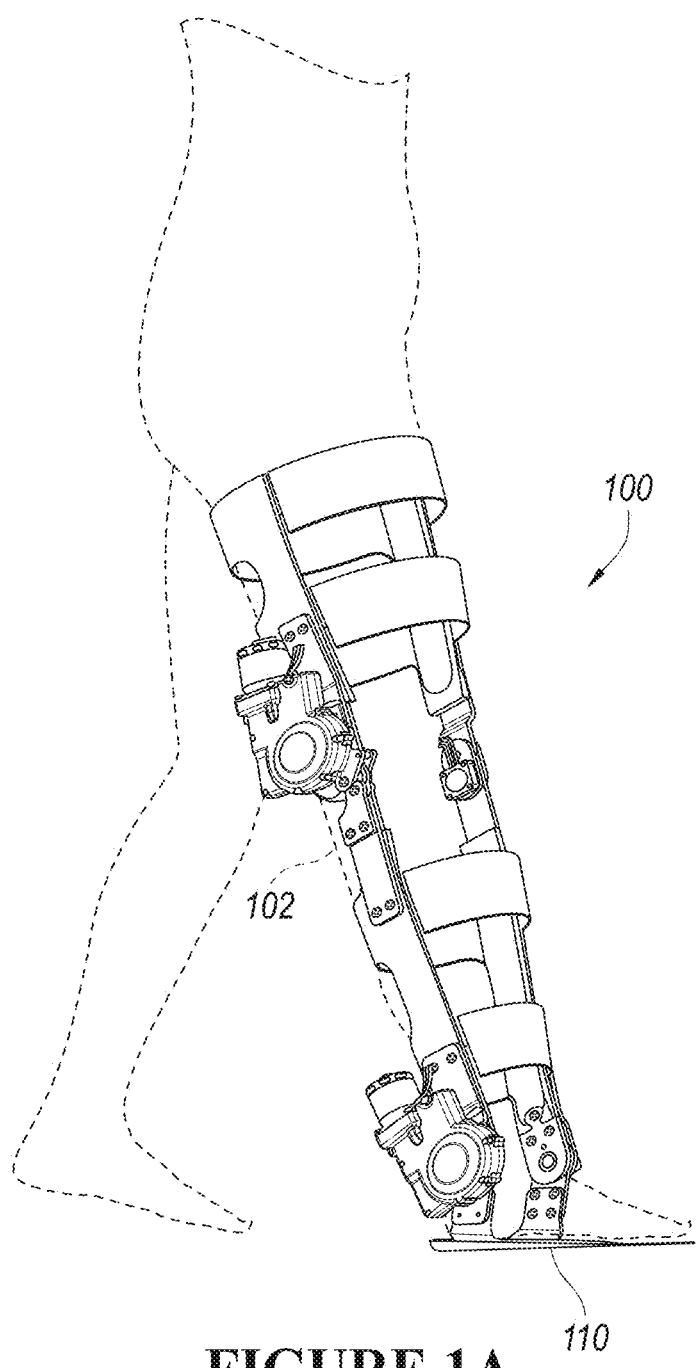
FIG. 1A shows an overview of a powered orthotic leg exoskeleton configured to be strapped onto the leg of a patient.
Figure 1B:
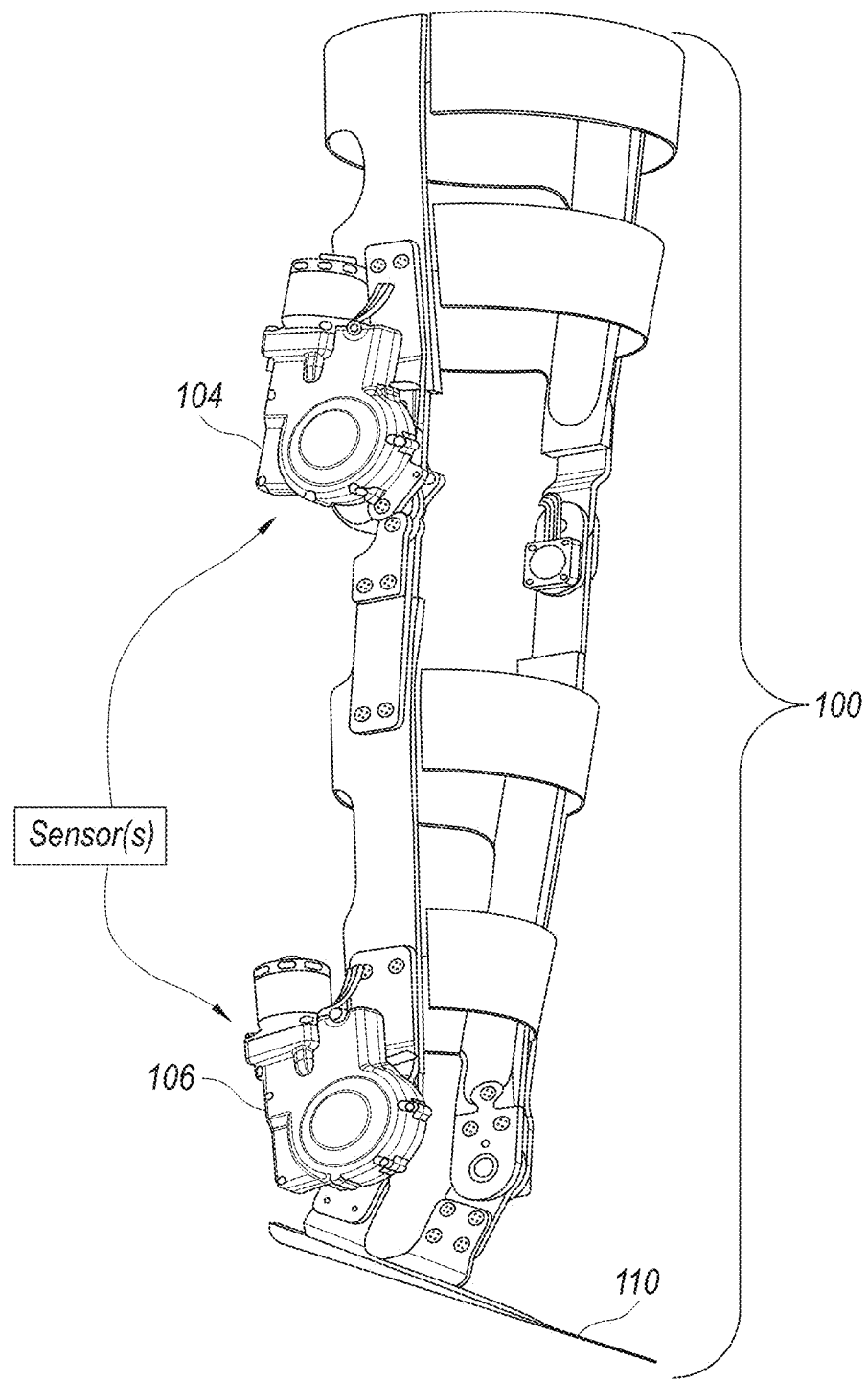
FIG. 1B shows a perspective view of the powered orthotic leg exoskeleton. This exoskeleton has a powered exoskeleton knee system and a powered exoskeleton ankle system. In some embodiments, both joints can be powered by the same type of motor module and clutch arrangement.

FIG. 1A shows an overview of a powered orthotic leg exoskeleton 100 configured to be strapped or buckled onto the leg of a patient 102. FIG. 1B shows a perspective view of the powered orthotic leg exoskeleton. This exoskeleton has a powered exoskeleton knee system 104 and a powered exoskeleton ankle system 106, both powered by the same type of motor module and clutch arrangement, which will be discussed in more detail shortly. Footpad 110 is also shown.

Figure 2A:
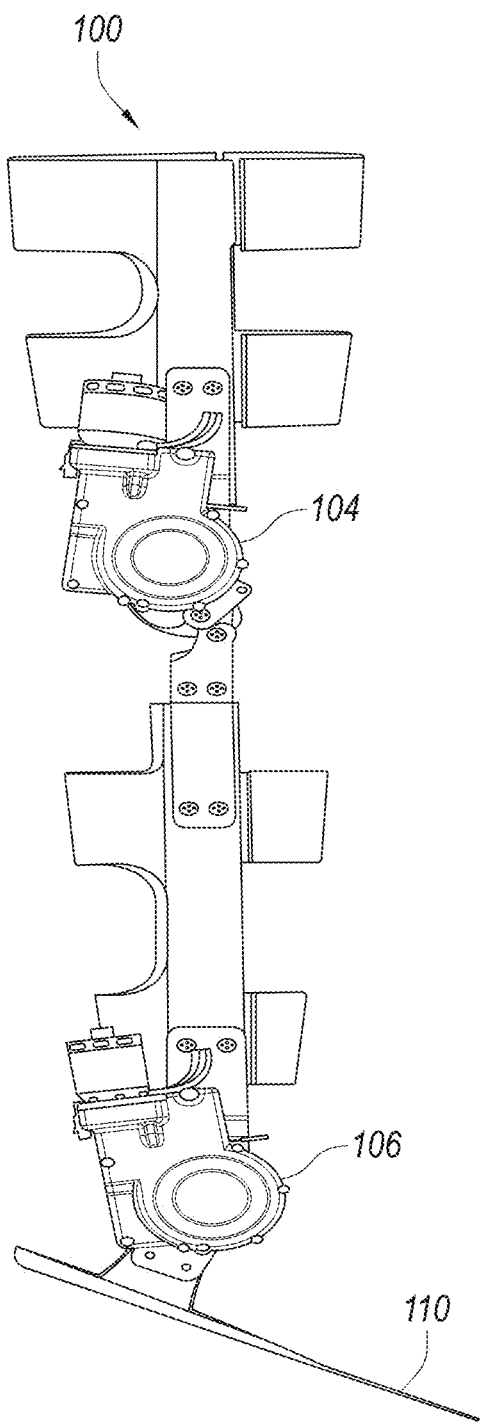
FIGS. 2A-2B show alternative solid and wireframe views of the powered orthotic leg exoskeleton, showing a detail of the orthotic joint's power module (surface cover removed) mounted onto the exoskeleton's polycentric knee joint system.
Figure 2B:
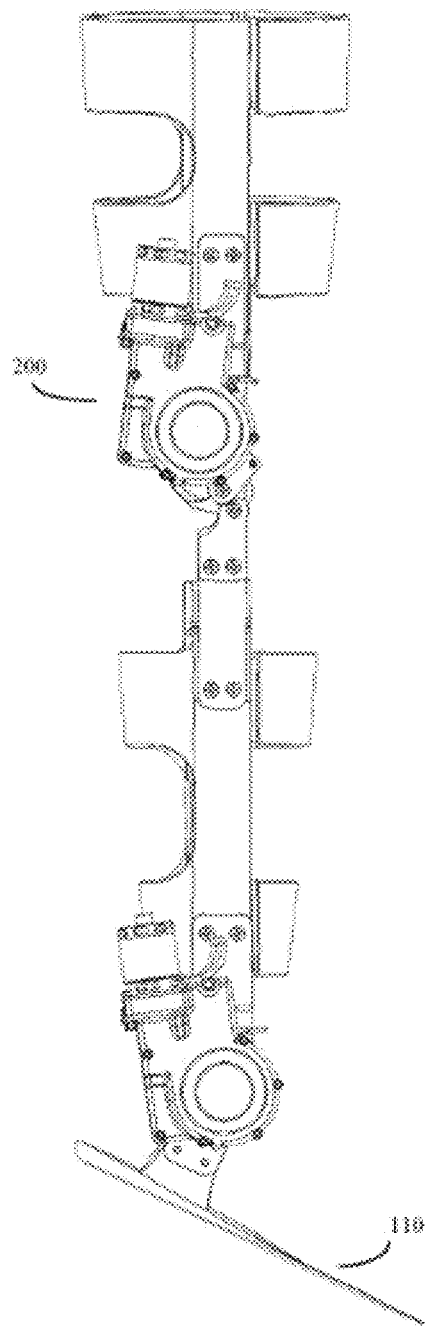
Figure 2C:
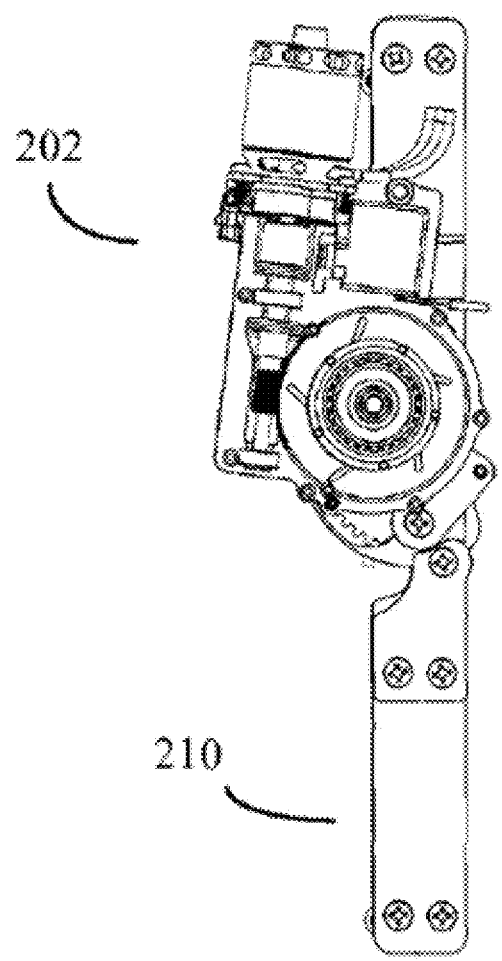
FIG. 2C shows the exoskeleton's knee joint system with the outside cover removed.
Figure 2D:
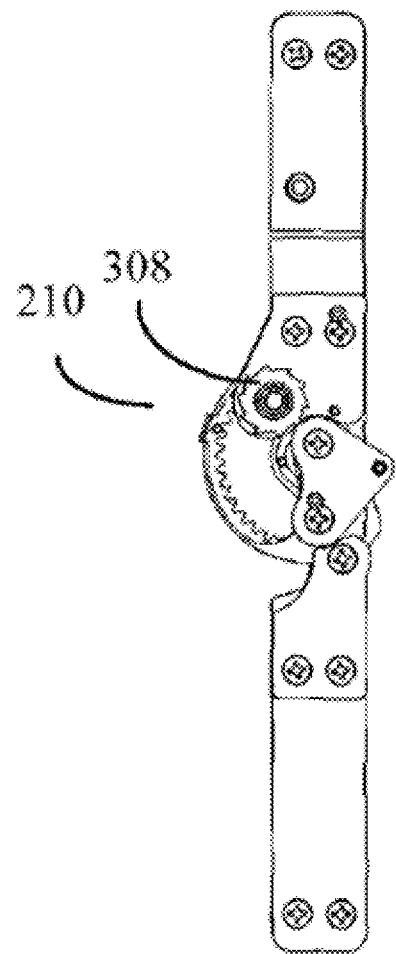
FIG. 2D shows part of the power and clutch module's ratchet wheel type clutch. A detail of the underlying polycentric knee joint system, coupled to the system's ratchet wheel and gear arrangement, is also shown.

FIGS. 2A-2B show alternative solid and wireframe views of the powered orthotic leg exoskeleton 100, showing a detail of the knee system's 104 power and clutch module in both outside cover attached 200 and outside cover removed 202 states. FIG. 2C shows the exoskeleton's knee joint system with the outside cover removed. FIG. 2D shows part of the power and clutch module's ratchet wheel type clutch. This power module and clutch module 200, 202 is, in turn, mounted onto the exoskeleton's knee joint system 210. A detail of the underlying knee joint system 210, and part of the power and clutch module's ratchet wheel type clutch 308 is also shown.

Because the exoskeleton is powered, usually with various electronic motors and actuators, some sort of sensors and control mechanism will usually be needed. With regards to the sensors, in some embodiments, at least some of the various orthotic exoskeleton structures can contain various types of either embedded or attached sensors. For example, a thigh section may contain sensors such as anterior and posterior Force Sensitive Resistors (FSR), or other force sensing transducer elements, arranged in variable positions relative to the knee joint.

In a preferred embodiment, the orthotic exoskeleton will be equipped with various force generating motors or actuators, along with appropriate mechanical systems designed to provide power to assist the user to perform certain types of movement. As previously discussed however, because normal human joint motion often consists of periods of time where force is applied to the joint, followed by other periods of time where essentially no force is applied to the joint, it is useful to provide a force generating system that can gracefully apply force to the joint when needed, but then also gracefully decouple from the joint during those periods of time where no force would typically be applied to the joint.

Further, although the motors or actuators typically used to apply power in this type of situation will be electrically driven (e.g. motors, servo motors, and the like), and thus lend themselves to computer control, it is also useful, at least in some embodiments, to further provide a mechanical system with built in mechanical limiters to avoid potential injury or discomfort to the user in the event that the computer control system malfunctions.

In some embodiments, motor drivetrain assemblies may be attached to at least some of the joints that exert torque on the brace. These motor drivetrain assemblies can be configured to assist (or resist if necessary) the user through actuation of the orthotic as the interface to the body. Here for example, the user may strap the orthotic exoskeleton to his or her leg. A user with partial paralysis or other form of muscle weakness can use the force provided by the motor drivetrain assemblies to rise from a sitting position, walk, or perform other functions. Conversely if the user has a problem that limits their normal range of joint motion, the orthotic exoskeleton may also be configured to gradually apply force to prevent the user's joints from inadvertently being positioned outside of the desired range of joint motion.

In contrast to prior art powered orthotic exoskeletons, in which the orthotic exoskeleton joint or joints were typically "hard coupled" (e.g. "continuously coupled") to the motor drivetrain (e.g. always coupled), in one embodiment, the invention may make use of a computer controlled transmission, such as a servo actuated ratchet clutch to "soft couple" (e.g. "reversibly coupled"), to produce a clutch that sometimes couples the motor drivetrain with the exoskeleton joint, and that other times allows for more free rotation of this joint. In other embodiments, this clutch need not have a ratchet function or component.

Figure 3:
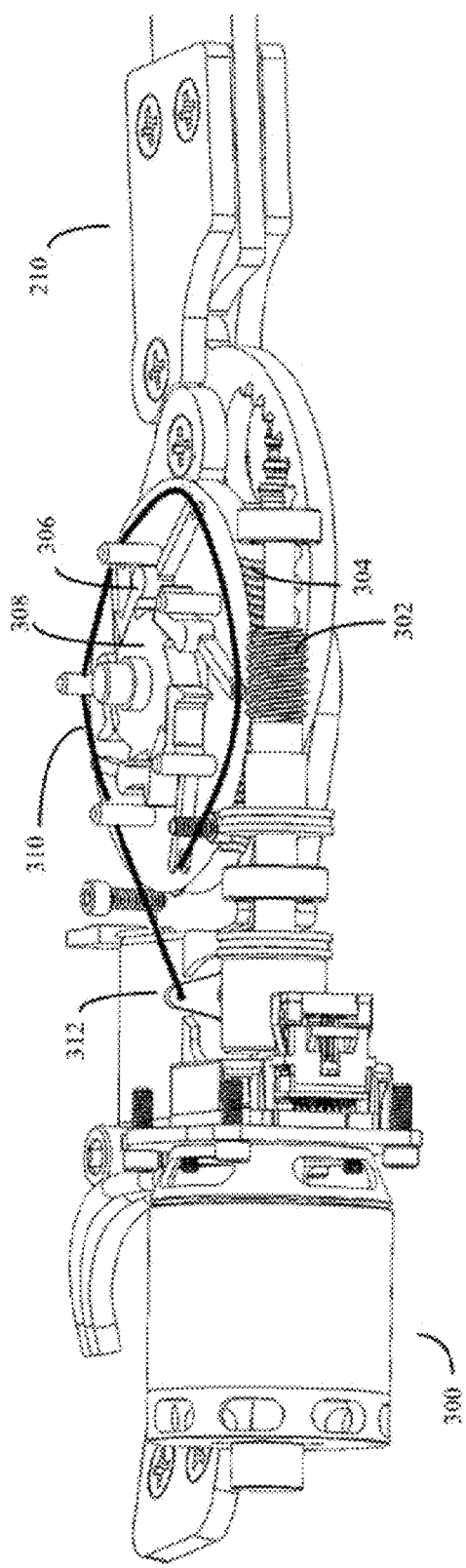
FIG. 3 shows some of the details of how the motor module and actuator controlled clutch can interface with the system's knee joint (here a polycentric knee joint is shown, alternative knee joints such as monocentric knee joints, may also be used). The system's motor can be coupled to the joint by various methods, such as the worm drive, ratchet clutch, and sun gear arrangement shown here. Various pawls may be attached to the motor driven worm wheel. These pawls in turn can interact with a ratchet wheel clutch arrangement. This clutch can be engaged and disengaged by an actuator, which in turn engages or disengages pawls from the ratchet wheel. Depending on the state of pawl engagement, the clutch can either transmit or not transmit torque from the motor to the knee joint.

FIG. 3 shows some of the details of how the motor module and actuator controlled clutch (200, 202 in FIG. 2) can interface with the system's polycentric knee joint 210. In this embodiment, which is shown in solid and wireframe views, the motor module's electric motor 300 is coupled to the orthotic exoskeleton joint via a worm drive, ratchet clutch, and sun gear arrangement. Other power train arrangements can also be used.

In this embodiment, motor 300 can drive a worm (e.g. screw type gear) 302, which in turn can mesh with a worm wheel 304. In some embodiments, this worm wheel may additionally have a hollow axle (not shown). Various pawls 306, often configured to press inward towards the worm wheel axle by the action of springs or other devices (not shown), are mounted on the worm wheel. A ratchet wheel 308 with an axle protruding through the hollow axle of the worm wheel is mounted above the hollow axle of the worm wheel. In the absence of any pawl engagement with the teeth and pockets of the ratchet wheel, the ratchet wheel is decoupled from the worm wheel 304, and hence from any torque applied by motor 300. As will be discussed, however, these various pawls 306 may be induced to either engage or disengage from the ratchet wheel 308 by a wire 310 attached to an electronic servo actuator 312, which tugs or releases the wire 310 depending upon electrical signals (usually received from a control system). Other types of pawls—ratchet wheel engagement and release mechanisms may also be used.

Thus, depending upon the force exerted by the electronic actuator 312 and wire, the various pawls 306, which are rotating around the ratchet wheel 308 by the action of the motor 300 and worm gear 302, 304, will either engage with the ratchet wheel 308 or not. This thus forms a ratchet wheel type clutch arrangement. When engaged, this ratchet wheel clutch arrangement transmits torque from the motor 300 to the polycentric knee joint. However, when disengaged, the motor 300 is effectively decoupled from any motion caused by various polycentric knee joint gears, and vice versa.

This reversible coupling capability has a number of advantages. In particular, when used with a leg mounted orthotic exoskeleton, this type of reversible coupling can allow the user to achieve a more natural walking gait (or stride) that is much less impaired by the robotic control of the motor system. That is, during the portion of the user's gait where motor assistance is required, the clutch can couple the motor drivetrain to the exoskeleton joint. However, during the free swing portion of gait, where the leg and joint would more naturally act like a free swinging pendulum, tight coupling to orthotic motors and gears is both unwanted and undesired. Here the system's processor and control system can signal the clutch to decouple the motor drivetrain from the orthotic exoskeleton joint. This will produce a more natural free swing motion during this part of the stride or gait. Note that it is thus contemplated that in use, the processor may signal the clutch to engage and disengage many times per gait cycle.

Another problem can occur when a user, either on their own, or with outside assistance, attempts to stand more quickly than the motor drivetrain is configured to allow. Absent the invention's ratchet type mechanism, if the motor drivetrain was continuously coupled to the orthotic exoskeleton joint, then an unexpectedly rapid change in joint angle might be resisted by the motor and gear arrangement. In this situation, the powered orthotic exoskeleton could actually end up hindering the user. This might damage the orthotic exoskeleton, cause strain on the user, or cause the user to lose balance and possibly fall.

However, with a ratchet and pawl type clutch arrangement, if the rate of change on the orthotic joint angle is unexpectedly high (e.g. it outruns the speed of the motor 300 and worm gear or other type drive train arrangement), the ratchet will permit this rapid change in joint angle to occur without damaging the system. Thus, if a sitting user gets someone to help them stand up, (instead of relying entirely only on the powered orthotic exoskeleton), resulting in an unexpectedly rapid rise, the invention's ratchet mechanism permits this more rapid than expected joint movement to occur without any unexpected resistance or strain and still maintains the support of the joint, thereby, preventing the user's fall or collapse (flexion) of the joint. This is because with this configuration, for example, the system's ratchet mechanism will permit this to happen. As mentioned, the ratchet mechanism will continue to support the user so they do not fall back into a flexed joint position; namely, the ratchet mechanism allows the user to outrun the powered orthotic exoskeleton without losing the support provided by the device.

Similarly, by using the invention's reversibly coupled motor drivetrain, if the user is unable to rise or walk with their own muscle power, and outside assistance is unavailable, the system can reengage (couple again) to allow the motor drivetrain to be able to provide assistance and support to the user.

Figure 4:
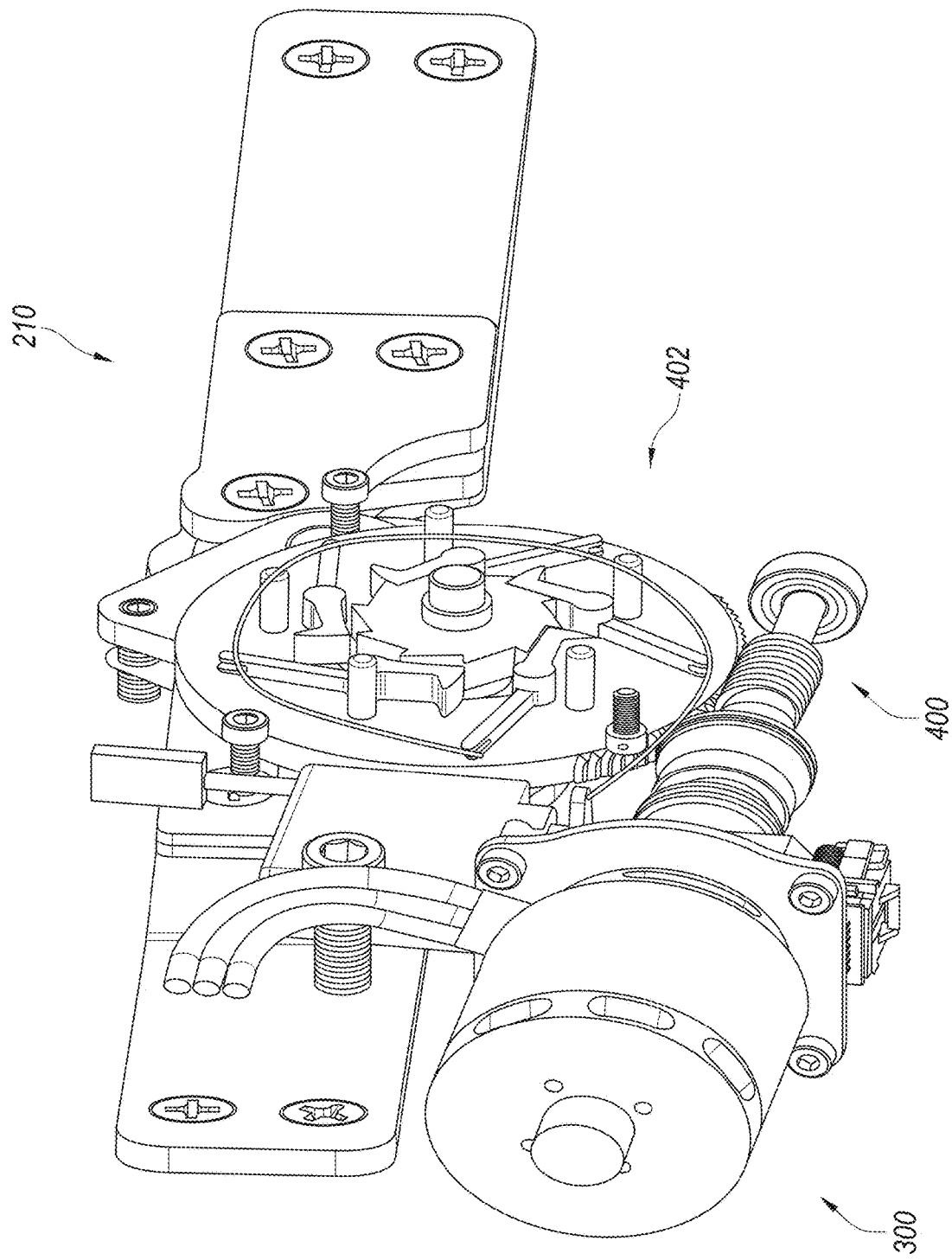
FIG. 4 shows an alternate solid view of the interactions between the motor module 300, worm drive 400, ratchet clutch 402, and polycentric knee joint 210 embodiment of the invention.

FIG. 4 shows an alternate solid view of the interactions between the motor module 300, worm drive 400, ratchet clutch 402, and polycentric knee joint 210.

Figure 5:
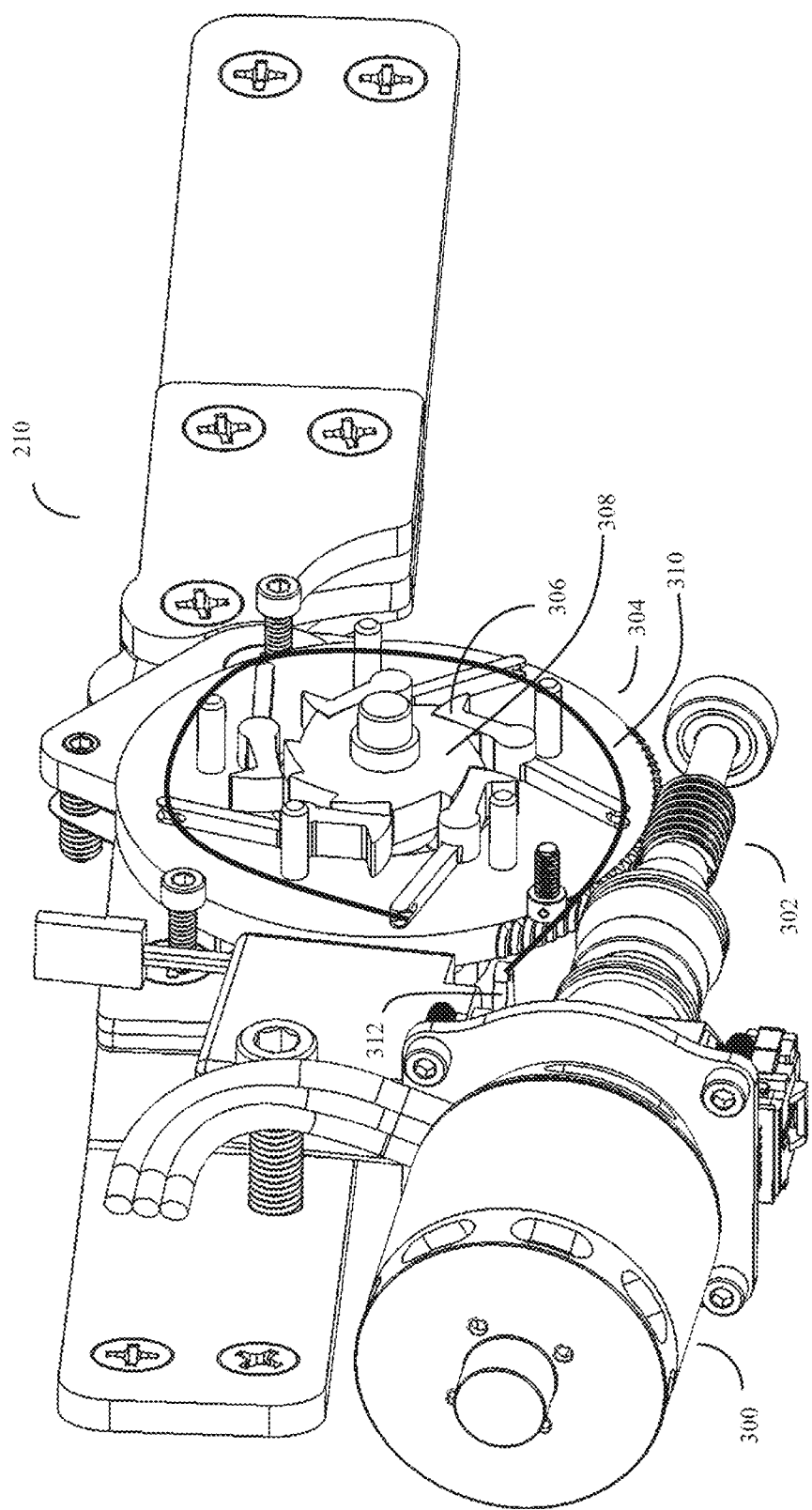
FIG. 5 depicts the components of the motor module, worm drive, ratchet clutch, and polycentric joint shown in FIG. 4.

FIG. 5 depicts the components of the motor module, worm drive, ratchet clutch, and polycentric joint shown in FIG. 4.

As previously discussed, various methods and devices may be used to engage and disengage the pawls from the ratchet wheel. Generally, some application of force will be needed to engage the pawls, and some application of force will be needed to disengage the pawls. In some embodiments, both the force to engage and the force to disengage may be provided by one or more actuators, usually electronic actuators under some form of computer (e.g. processor) and software control.

In other embodiments, although either the force to engage, or the force to disengage, may be provided by an actuator, the opposing force may be provided by another mechanism, such as by spring action or other elastic action from one or more opposing springs. This type of actuator-engage, spring action disengage mechanism is shown in more detail in FIG. 6.

Figure 6A:
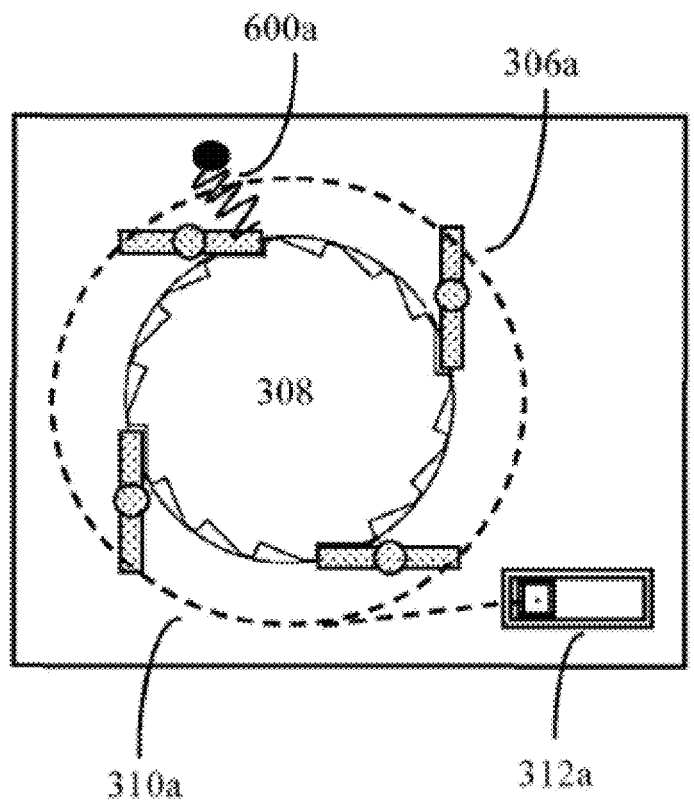
FIGS. 6A-6B show additional details of one specific embodiment of the clutch when engaged and disengaged, respectively. In this embodiment, the pawls may be attached to springs that nominally will force the pawls to contact the pockets between the ratchet wheel's teeth. The pawls may also be connected to a wire which in turn is connected to an actuator (usually under processor control). When the actuator applies force to the wire, the wire tightens against the opposing force of the springs. This in turn forces the pawls to pivot and disengage from the ratchet wheels, thus effectively disengaging the clutch.
Figure 6B:
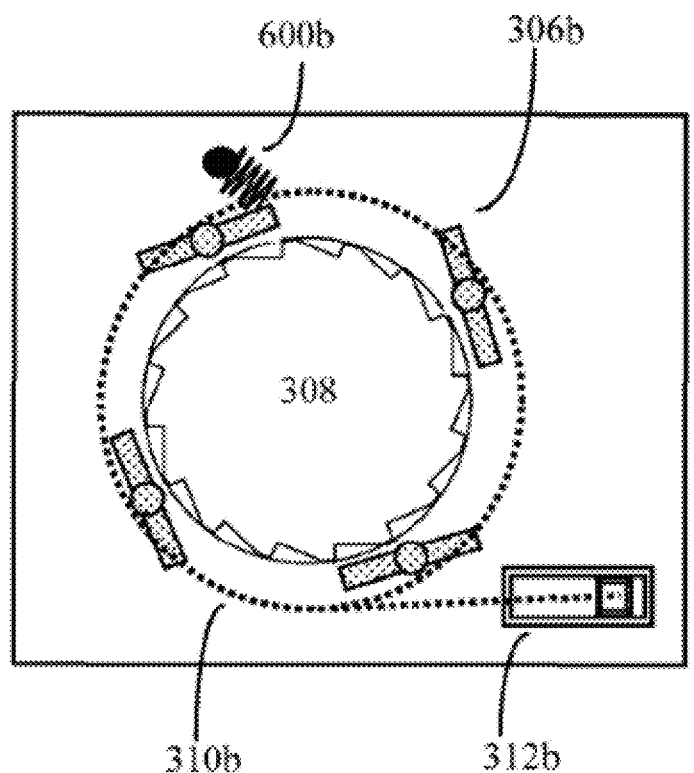

FIGS. 6A-6B show additional details of one specific embodiment of the clutch when engaged and disengaged, respectively. In this embodiment, the pawls 306a, 306b which are configured to pivot about their central regions are attached to springs 600a, 600b. Absent other sources of force, these springs 600a will nominally act to push the end of the pawl 306a into the pockets between the ratchet wheel's teeth, thus causing the clutch to engage. (Alternatively, the springs could be configured to act in the opposite manner, and nominally push the end of the pawl away from the pockets between the ratchet wheels teeth.) Here for simplicity, only one spring is shown, however it is contemplated that all pawls may have their own associated springs with this type of arrangement.

In this embodiment, the various pawls are also connected to, or transverse on, a wire 310a, 310b, which in turn is connected to a processor controlled actuator 312a, 312b.

When the actuator 312b applies force to the wire, the wire 310b tightens against the force of the opposing springs 600b, and this actuator applied force, in turn, causes the pawls to disengage from the ratchet wheels 306b. Thus, this effectively disengages the clutch. When the actuator 312a releases force from the wire 310a, the springs once again 600a push the pawls into the pockets of the ratchet wheel 306a.

Thus, as previously discussed, in some embodiments of the invention, the reversibly coupled motor drivetrain may use a ratchet and servo controlled pawl system as a clutch to couple and decouple the motor drivetrain to the orthotic exoskeleton joint. Although it is contemplated that this coupling and decoupling process will normally be done under electronic (often computer processor control), other control mechanisms, including purely mechanical control mechanisms, may also be used.

Figure 7A:
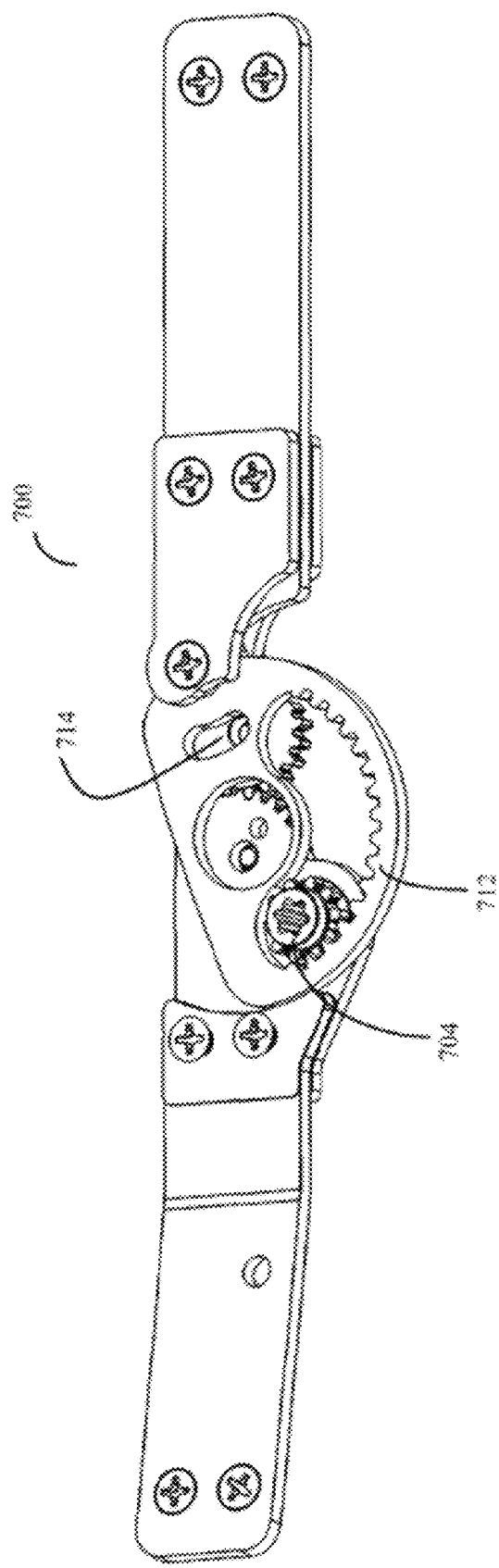
FIGS. 7A-7B show two wireframe views of selected portions of the system's polycentric knee joint. The ratchet clutch, when engaged, transfers torque to the knee joint's stationary gear/planetary gear. This gear in turn interacts with the internal sun gear portion of the knee joint's partial planetary gear arrangement. A clearer view of the joint's underlying sun gear and lower joint stationary or planetary gear is also shown.
Figure 7B:
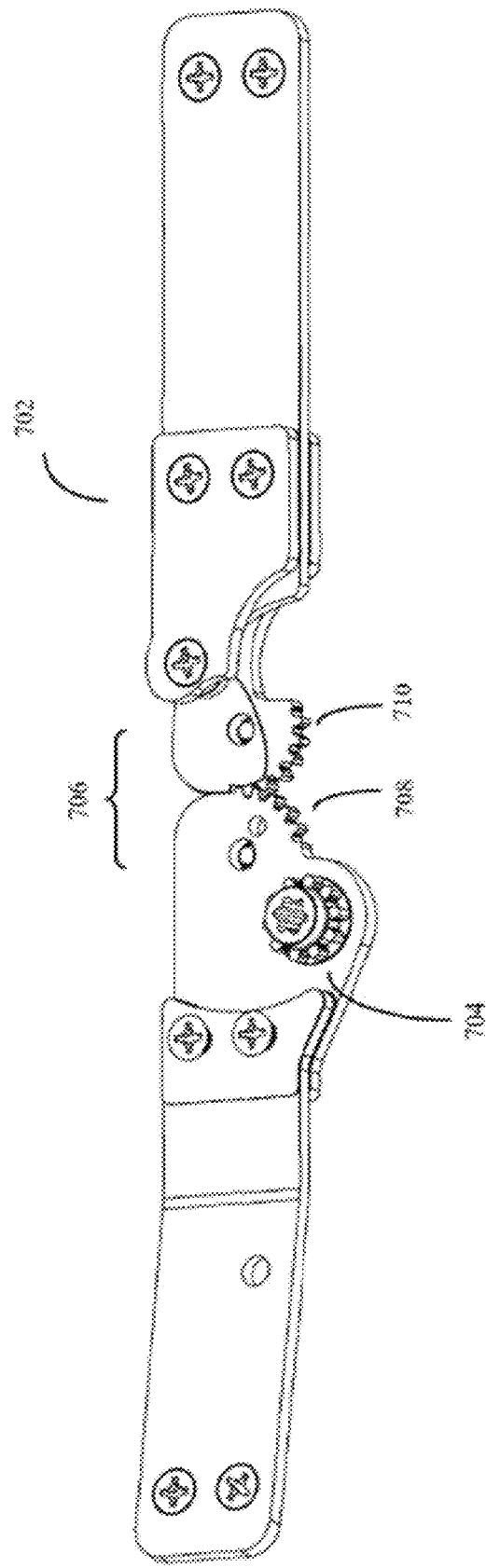

FIGS. 7A-7B show two wireframe views of selected portions of the system's polycentric knee joint 201, various portions of which are shown in 700 and 702. The ratchet wheel 308 of FIGS. 6A-6B, when engaged, transfers torque to the knee joint's stationary or planetary gear 704. This, in turn, interacts with the internal gear portion of the knee joint's planetary gear. A clearer view of this joint's underlying sun gear 708 and lower joint planetary gear 710 is also shown as 702.

In some embodiments, the invention's polycentric knee joint 210 700 702 may have an approximately 1" center-to-center central link 706, with equal travel gearing on the distal and the proximal section of the joint. As previously discussed, this type of polycentric link can be driven by a stationary gear 704 (or planetary gear 704). Again, this stationary or planetary gear can be driven by the motor 300 by way of the ratchet wheel 308 and clutch arrangement, and may further be supported by bearings on the proximal joint section (not shown).

This stationary or planetary gear 704 in turn can act upon a partial sun gear segment 712, which pivots on a bearing position 714 on the distal section of the polycentric knee joint. In some embodiments, the polycentric knee joint 210 may additionally comprise a gear reduction system, which can act to modify the relative toque applied to the joint (usually by a motor 300 or other actuator arrangement) by some designed amount.

Figure 8A:
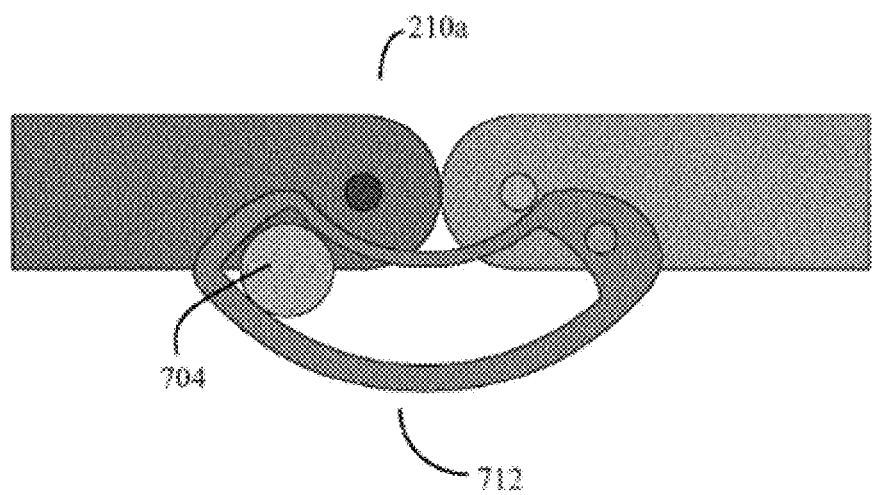
FIGS. 8A-8C show a schematic drawing of the system's polycentric joint operating at various angles. More specifically.
Figure 8B:
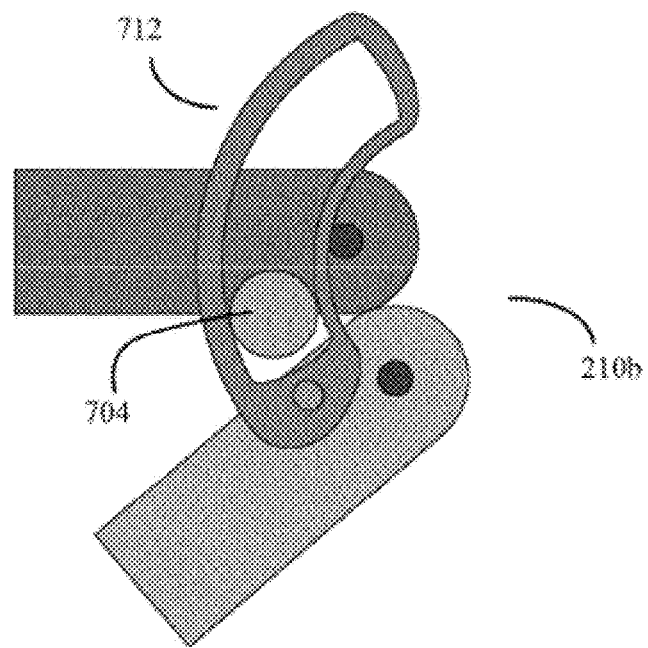
Figure 8C:
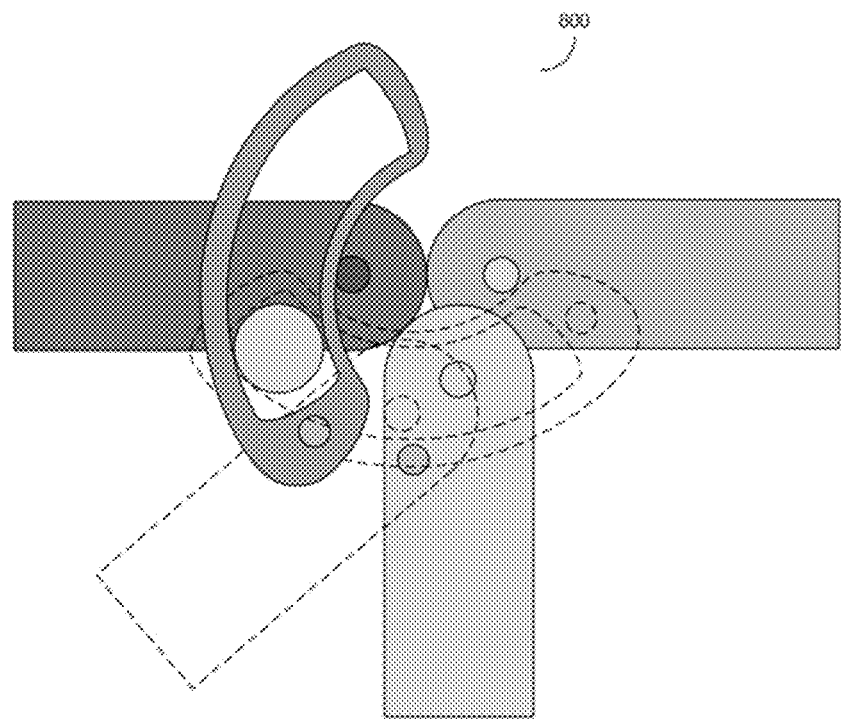

FIG. 8 shows a schematic drawing of the polycentric joint 210 operating at various angles, including an essentially straight 180 degree angle 210a, a highly bent angle 210b, and various angles in between 800.

Figure 9:
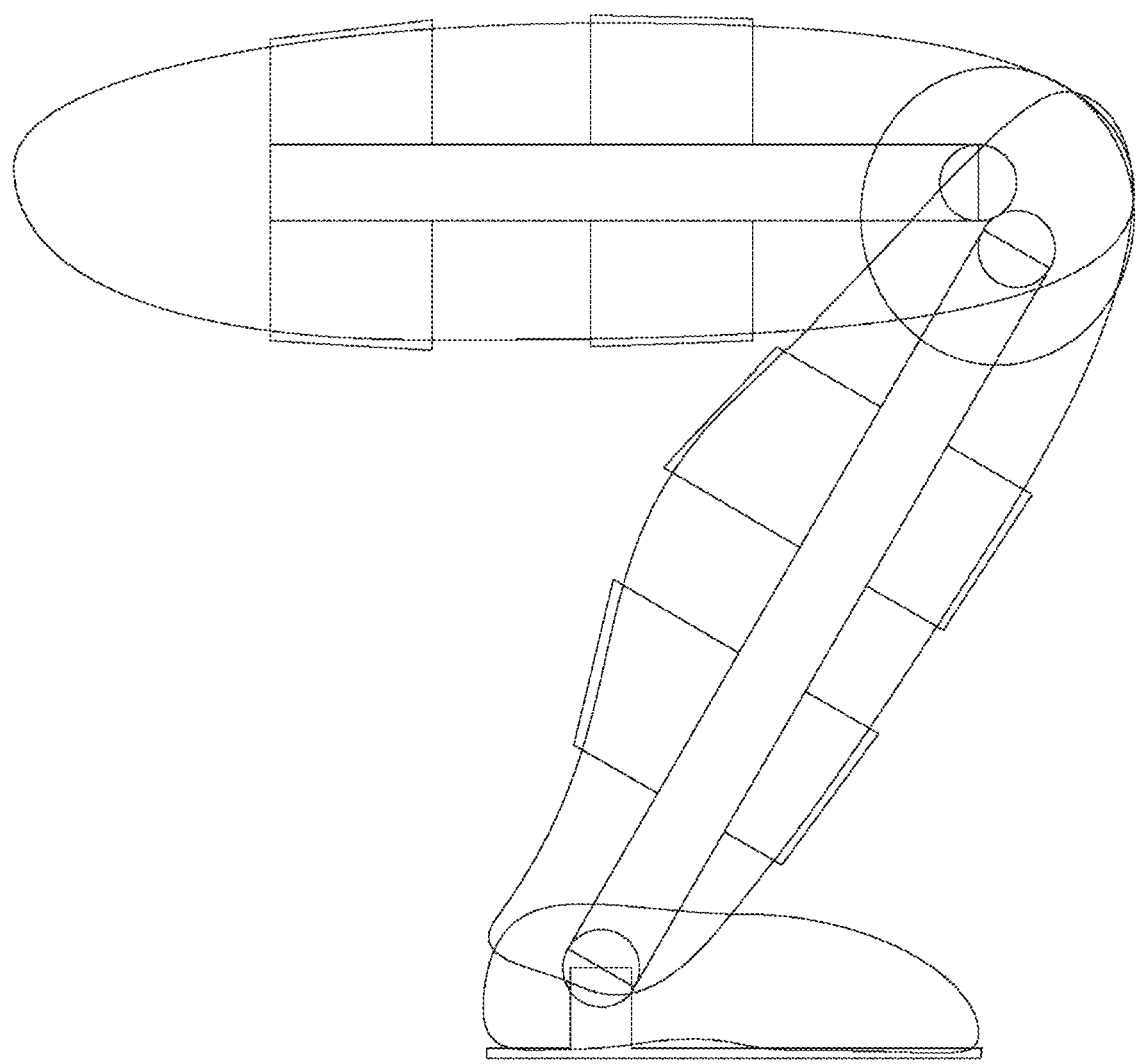
FIG. 9 shows a schematic drawing showing how the orthotic exoskeleton may bend around its knee and ankle joints.

FIG. 9 shows a schematic drawing showing how the orthotic exoskeleton may bend around its knee and ankle joints.

By varying the positions of the joints and gear arrangement, the applied torque curve may be manipulated as desired. For many common physiological joint motions and limb actions, non-linear applied torque curves are desirable, and such non-linear applied torque curves may be achieved by this method.

So to Summarize:

In the coupled state, the clutch servo actuator allows the clutch pawls to engage with the clutch ratchet wheel. This ratchet is used to communicate torque from the motor to the gearing system that drives the orthotic exoskeleton joint.

In the uncoupled state, the clutch servo actuator disengages the clutch pawls entirely from the clutch ratchet wheel, thus severing the mechanical connection between the motor and the gearing system that drives the orthotic exoskeleton joint. This thus permits the orthotic exoskeleton joint to swing relatively freely.

One potential benefit of using a high force clutch rather than a low force clutch is that in some embodiments, a low force clutch may operate at point further down the drivetrain (closer to the motor). This can allow more mass and friction to be driven by the clutch when the system is disengaged.

In some embodiments, the invention may be a module joint system attached to a composite orthotic system such as an orthotic exoskeleton.

In alternative embodiments, the invention may be any orthotic system designed to closely couple to the patient's limbs, torso, head, neck, or soft tissue.

In some embodiments, the orthotic exoskeleton may have mechanical joints that either transfer torque (e.g. mechanically supplied torque) or which confer additional stability (often both medially and laterally) to the correspondingly located human or animal user's natural joint.

Additional Discussion

As previously discussed, in some embodiments, the orthotic exoskeleton may be designed to be controlled, at least to some extent, by various electronic circuits, such as one or more microprocessors/microcontrollers, and the like. To facilitate such electronic control, in at least some of these embodiments, the orthotic may also incorporate various sensors or transducer elements. Various types of sensors and transducers can be used, such as embedded Force Sensitive Resistors (FSR), gyros, accelerometers, potentiometers, and angle sensors, These sensors or transducer elements can perform various sensing functions, such as sensing or determining the relative force applied to the anterior or posterior portions of the orthotic on both the thigh segment as well as the shank segment. The sensor or transducer elements can be placed at different points on the proximal and distal segments of the orthotic exoskeleton's joint. Data from these sensors can be used by the system's electronic control circuitry (often one or more processors and associated software) to calculate the relative torque applied by either the orthotic exoskeleton's mechanical systems, or by the human user, across the joint.

In the case where the orthotic control system knows that the orthotic exoskeleton is itself applying relatively little torque, and the system is instead sensing extra torque exerted by the attached human user, this torque calculation can be used to help determine the intention of the wearer of the device. For example, a human user attempting to stand up may apply human derived torque to the orthotic exoskeleton joint. The sensor or transducer elements can measure this, and depending on programming, the orthotic control system may determine that the orthotic exoskeleton should apply some additional torque to assist or resist the human user in this effort.

Conversely, consider the situation where the human user is accidentally applying too much pressure or torque to a damaged or problematic natural joint, and there is a risk that the user's natural joint may be extended beyond the range that is considered medically advisable. The system can also detect this, and may determine that the orthotic exoskeleton should apply additional torque in an opposite direction to prevent the user's natural joint from being extended more than what is deemed medically acceptable. More specifically, the system motors (or other actuators) attached to each orthotic exoskeleton joint may be driven to assist or resist (as appropriate for the situation) the patient's actions according to one or more processor controlled algorithms.

Overextension may also be prevented by various types of mechanical limiters. Thus, the powered orthotic exoskeleton can be used for help support the user by providing some resistance to motion as the user attempts to sit down (thus helping to prevent collapse of the user and orthotic). Alternatively, the powered orthotic exoskeleton can be used to provide lift when the user attempts to go from a seated position to a standing position. Similarly, the system can provide some resistance to motion as the user goes from a standing position to a squatting position (again helping to prevent collapse), and provide lift (assistance) when the user goes from a squatting position to a standing position.

In addition to embedded force sensors, the system may also include one or more orthotic exoskeleton joint angle sensors as well. These joint angle sensors can also transmit feedback data to the orthotic exoskeleton's control system. These can be used for the above described functions as well, and this information also allows the system to achieve more sophisticated types of control, such as closed loop position, velocity, or acceleration control.

As shown in FIGS. 1 and 2, in the case of a limb mounted orthotic exoskeleton, the orthotic exoskeleton may also include a structural footplate 110. A human user 102, for example, would strap the orthotic exoskeleton on over their thigh and lower leg portions, and place their foot on top of this structural footplate 110.

In some embodiments, it may also be useful to place or attach various sensors or transducers, such as the previously discussed FSR sensors or transducers, to this structural footplate 110. These sensors can be used for various purposes, such as detecting the relative normal ground reaction force between the patient (user) and the outside surface (e.g. ground, stairs, etc.) that the user is attempting to traverse or otherwise interact with. Data from these various footplate mounted sensors can be used by the orthotic exoskeleton's control system and software to further use information derived from outside surface interactions to further optimize control over the various orthotic exoskeleton motors and actuators.

As previously discussed, in some embodiments, the orthotic exoskeleton joint 210 may couple one or more motors or actuators 300, 312 to the orthotic joint 210 using the previously described controllable asymmetric ratchet wheel-pawl clutch system. This system can couple the orthotic joint to an orthotic joint motor (otherwise configured to apply torque to the orthotic joint) in a controllable (on-off) manner.

Consider a situation where the user is using the orthotic exoskeleton, strapped to the user's leg, to raise the user's knee. The above clutch arrangement can allow the orthotic exoskeleton's motor to apply torque at a certain rate to help the user raise the knee. However, if the user wishes to use their own muscles to raise this knee even faster, the ratchet clutch 308 will allow the user to do so. Further, if the user then wishes to allow the knee joint to freely swing in an opposite direction, the clutch (usually controlled by a processor, software, and various sensors) can be released to allow this free swing. The net result is a more natural human-like motion, as opposed to an unnatural, robotic-like, motion if this type of clutch arrangement were not used.

Returning again to the discussion of FIG. 6, in one embodiment, a plurality of motor driven clutch pawls 306 may be configured in a pivot and spring arrangement around the clutch's ratchet wheel 308. These motor driven clutch pawls 308 may be further attached to a loop of wire 310 or other control mechanism. This wire 310 in turn may be attached to a clutch control servo actuator 312, which is configured to apply force to the wire (or not), in response to an electrical signal.

When the wire is loose (e.g. the clutch control servo actuator is configured to not apply force) 310a, 312a, the springs 600a force the motor driven clutch pawls into their respective pockets on the clutch ratchet wheel 308. When the wire is tightened 310b, the applied force from the clutch control servo actuator 312b causes the clutch pawls 306b to pivot back against the resisting force of the springs 600b as the springs compress. The motor driven clutch pawls 306b are thus disengaged from the ratchet wheel 308, and thus the ratchet wheel no longer receives torque from the motor 300. This allows the ratchet wheel and the other unpowered gears in the orthotic exoskeleton joint (e.g. 704, 708, 710, 712) to move unimpeded by the limiting action of the motor 300.

Alternate embodiments of the system can include a dual direction clutch system in which each direction of joint rotation can be selected for operation on either an independent or dual basis by one or more single or dual action servo mechanisms.

In another embodiment, the opposing force on the clutch pawls can also be made adjustable by the same or different servo actuator used to engage or disengage the cultch pawls from the ratchet wheel. Here, for example, the spring force acting on the clutch pawls can also be adjusted by servo actuator control. By controlling this spring force, the degree of engagement of the pawls with the ratchet wheel, or the number of pawls engaged with the ratchet wheel, may also be managed and controlled. This may be useful as either a fail-safe torque limiter that might operate even in the event of control system malfunction, or alternatively might be used to more precisely control the amount of torque applied to the joint in certain conditions. This can effectively result in a controlled torque application clutch arrangement.

We claim:

1. A method of operating an exoskeleton device, the method comprising:
   receiving sensor information;
   connecting a clutch system to a pulley system;
   determining whether to engage or disengage a drive train gear to the clutch system based on the sensor information;
   actuating with a servo to open or close a pawl engagement opening of the clutch system so as to engage or disengage the clutch system based on the sensor information;
   engaging the drive train gear through the clutch system when determined to engage the drive train gear;
   disengaging the drive train gear from the clutch system when determined to disengage the drive train gear;
   powering a first motor to drive the drive train gear for controlling a joint or segment of the exoskeleton device; and
   enabling free swing motion in the joint or segment when the drive train gear is disengaged from the clutch system.

2. The method of claim 1, wherein determining whether to engage the drive train gear includes determining whether to
   (i) utilize a second motor to assist the first motor in actuating the joint or
   (ii) independently actuate the joint with the first motor.

3. The method of claim 1, further comprising controlling an extension and flexion of the joint.

4. The method of claim 1, further comprising controlling an extension and flexion of the joint by engaging a second motor to the clutch system.

5. The method of claim 1, further comprising controlling an extension and flexion of N number of joints, including the joint, by engaging N number of motors, including the first motor, to the clutch system.

6. The method of claim 1, further comprising controlling an extension and flexion of N number of joints, including the joint, by engaging N+1 number of motors, including the first motor, to the clutch system.

* * * * *